United States Patent [19]

De Busscher et al.

[11] 4,150,525
[45] Apr. 24, 1979

[54] COMBINE HARVESTER

[75] Inventors: Cyriel R. J. De Busscher, Sijsele; Marcel A. Dekeyzer, Brugge; François van Herpe, Vlierzele, all of Belgium

[73] Assignee: Sperry Rand Corporation, New Holland, Pa.

[21] Appl. No.: 793,582

[22] Filed: May 4, 1977

[30] Foreign Application Priority Data

May 11, 1976 [GB] United Kingdom ............... 19221/76

[51] Int. Cl.² ............................................. A01D 41/06
[52] U.S. Cl. .................................... 56/14.6; 130/27 R
[58] Field of Search .......................... 56/14.6, DIG. 2; 130/27 R, 27 E, 27 D, 27 JT, 27 F, 24–26

[56] References Cited

U.S. PATENT DOCUMENTS

| 3,648,709 | 3/1972 | De Coene | 130/27 JT |
| 3,678,938 | 7/1972 | De Coene | 130/27 F X |

FOREIGN PATENT DOCUMENTS 1782012  7/1971  Fed. Rep. of Germany ............ 56/14.6

Primary Examiner—Russell R. Kinsey
Attorney, Agent, or Firm—Ralph D'Alessandro; John B. Mitchell; Frank A. Seemar

[57] ABSTRACT

In a combine harvesting machine comprising a plurality of interconnected sub-assemblies, there is provided the apparatus and the method for utilizing an entirely separate, self-contained, and self-supporting straw walker sub-assembly that may be mounted to a mobile chassis during the production line assembly.

15 Claims, 10 Drawing Figures

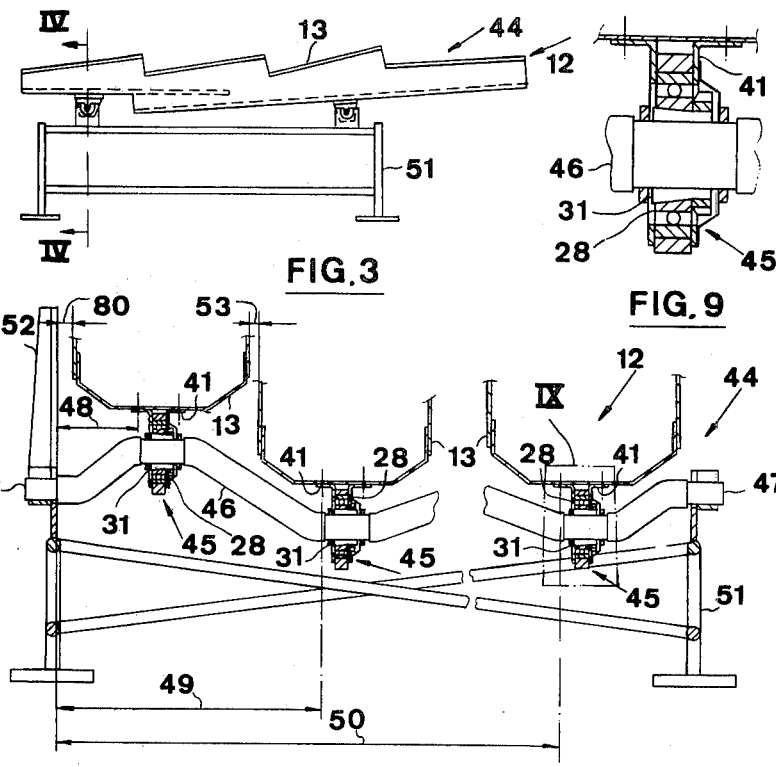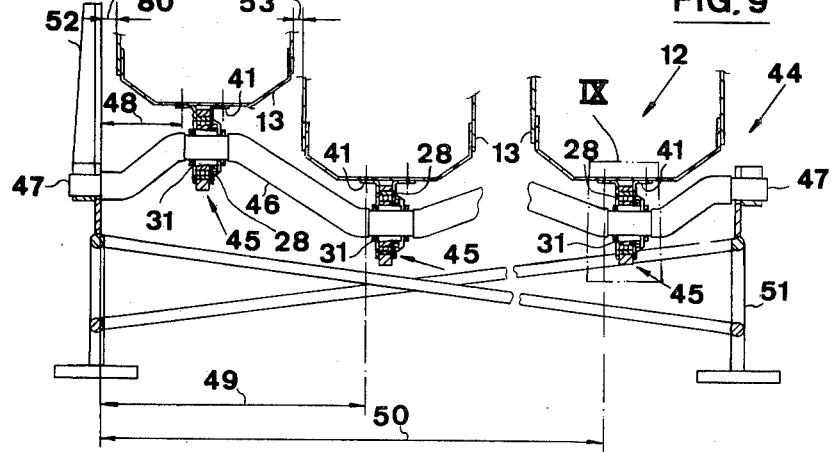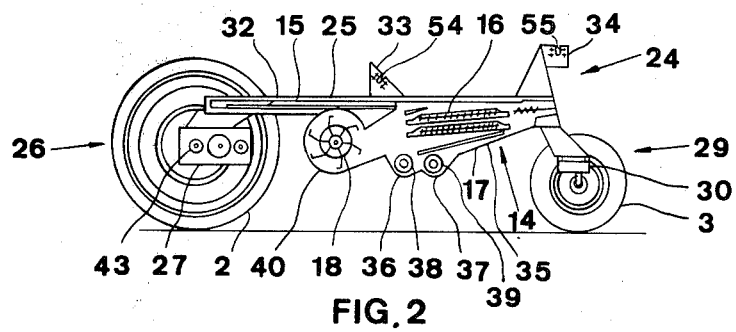

COMBINE HARVESTER

BACKGROUND OF THE INVENTION

1. Field of the Invention

The present invention relates to harvesting machines comprising a plurality of sub-assemblies connected together, and to methods of making harvesting machines by connecting sub-assemblies together.

2. Description of the Prior Art

The principle of making large machines such as combine harvesters from a number of pre-formed modules or sub-assemblies is known in the art. For example, it is common practice to construct interchangeable and independent maize and grain headers which can be mounted on a base unit. Dependent on the crop to be harvested, either the grain or the maize header is mounted on the base unit. Furthermore, for transporting the combine harvester on public roads, the header is normally detached from the base unit and placed on a trailer which is then trailed behind the base unit with the header disposed in a generally fore-and-aft direction. The header is an independent sub-assembly which, in the case of grain header, comprises a header trough, cutter means, a feeder auger and a header reel.

It is also known to make the base unit of a combine harvester (the base unit comprising the entire machine minus the header and the straw elevator) of a certain number of sub-assemblies. This is primarily intended to facilitate the construction of the base unit and to reduce manufacturing costs.

However, while the principle of construction using modules or sub-assemblies is already known in the construction of combine harvesters, still further improvements are possible.

In German Pat. No. 1.782.012, it has been proposed to divide the lower portion of the base unit into three sub-assemblies, namely a front sub-assembly with a traction axle, a gearbox and traction wheels; a rear sub-assembly with a rear axle and steerable wheels and a middle sub-assembly with a framework supporting a cleaning device. One disadvantage of this arrangement is that as long as the three sub-assemblies are separate, all three have to be carried through the assembly line of the plant on carriages.

In another arrangement, the base unit comprises a front sub-assembly with threshing means and a front straw walker shaft, and a rear sub-assembly comprising a framework with a rear straw walker shaft therein. Obviously the straw walkers can be mounted on the straw walker shafts only after both the front and rear sub-assemblies are assembled together. This is however very awkward for several reasons, namely;

the need to assemble the straw walkers with relatively small tolerances on the walker shafts, the fact that the straw walkers are elongate structures which are difficult to handle, the fact that the cumbersome straw walkers require to be mounted on the walker shafts in a relatively small space, the fact that the straw walkers require to be mounted on the base unit at a considerable height above ground level, the fact that the straw walkers require to be mounted at a location above a cleaning shoe and rearwardly of the threshing means, and that at the moment of the mounting of the straw walkers, the cleaning shoe and the treshing means are already installed, so that access to the straw walker region is difficult. Moreover, unless special precautions are taken to avoid this, damage might be caused to the cleaning shoe when assembling the straw walkers on the respective shafts.

SUMMARY OF THE INVENTION

An object of the present invention is to simplify the construction of harvesting machines made from separate sub-assemblies so as to make the construction and assembly of the various components easier and to reduce construction time and manufacturing costs.

According to one aspect of the present invention, a harvesting machine comprises a plurality of sub-assemblies connected together, one of the sub-assemblies having front and rear wheels interconnected by a framework forming a chassis for the machine.

Preferable another of the sub-assemblies is a straw walker sub-assembly comprising straw walkers mounted on straw walker shafts. The framework may be generally elongate in a fore-and-aft direction and may comprise laterally spaced side members which extend fore-and-aft. The framework may support at the forward end thereof a gearbox connected in driving relationship to the front wheels, the rear wheels being steerable.

Preferably the mobile sub-assembly receives and supports the entire cleaning means which may comprise a forward grain pan, a rearward cleaning shoe for mounting cleaning sieves therein, an intermediate cleaning fan below the grain pan discharge end and a clean grain and a tailings collecting trough with the associated augers therein. Some of these components such as the cleaning fan and the cleaning shoe may form further sub-assemblies. The assembling of the cleaning means on the framework of the mobile sub-assembly can be easily carried out because of the good access to the inner side of the framework and because of the framework is positioned at the ideal height of roughly one meter above ground level.

According to another aspect of the invention there is provided a method of making a harvesting machine by connecting together a plurality of sub-assemblies, one of the sub-assemblies being a mobile sub-assembly having front and rear wheels interconnected by a framework forming a chassis for the machine. Another of the sub-assemblies may be a straw walker sub-assembly which is mounted on the mobile sub-assembly.

By recourse to the invention it is less difficult to meet the relatively narrow tolerances when mounting the straw walkers on the straw walker shafts. Further, assembling the straw walkers on the associated shafts is less cumbersome because ample space is available, since an assembly jig can be positioned at the ideal height above the ground level and because no other components restrict access. Furthermore, the risk of damage to other components of the machine while assembling the straw walker sub-assembly on the mobile sub-assembly is avoided. Assembly workers can work in the best ergonomic conditions when assembling the machine.

Preferably the straw walkers are supported on straw walker shafts by means of special bearings which are know in the art. These special bearings are conveniently mounted on the shafts, after which the straw walkers can be secured thereto.

BRIEF DESCRIPTION OF THE DRAWINGS

A combine harvester according to the invention will now be described, by way of example, with reference to the accompanying drawings, in which:

FIG. 2 is a side view of a mobile sub-assembly of the machine after cleaning means have been mounted thereon, FIG. 3 is a side view of an assembly jig with a straw walker sub-assembly assembled thereon, FIG. 4 is a sectional view, on an enlarged scale, on the line IV—IV of FIG. 3, FIG. 9 illustrates, on an enlarged scale, the portion of FIG. 4 indicated at IX.

DETAILED DESCRIPTION OF THE INVENTION

In General

Figure 1:
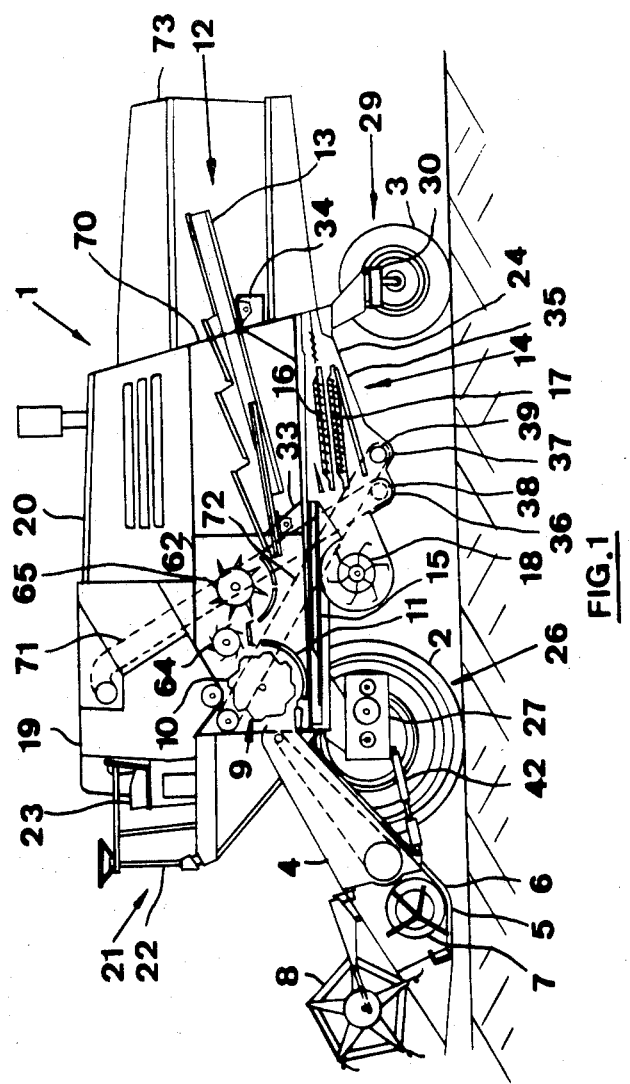
FIG. 1 is a side elevation of the combine harvester, parts being broken away to show internal detail.

With reference to FIG. 1, the combine harvester comprises a base unit 1 supported at its forward end by a pair of driven traction wheels 2 and at its rearward end by a pair of steerable wheels 3. The combine harvester supports at its forward end the usual elevator 4 carrying a grain header 5. The header 5 comprises a header trough 6 with cutter means (not shown) at its forward end, a header auger 7 and a conventional reel 8. As is generally known in the art, the elevator 4 is formed as a sub-assembly which can easily be mounted at the forward end of the base unit 1, which can be adjusted angularly by means of hydraulic cylinders 42 and which supports at its other end the header 5 which may also be a pre-formed sub-assembly. Different types of headers, such as grain headers, or corn headers can be attached to the elevator 4.

The combine harvester also comprises threshing means 9 including a threshing cylinder 10 and a cooperating concave 11, separating means 12, including straw walkers 13, cleaning means 14, comprising a grain pan 15, cleaning sieves 16, 17 and a cleaning fan 18, a grain tank 19 for storage of clean grain, an engine compartment 20 with an internal combustion engine (not shown) therein and an operator's platform 21 with a steering column 22, a seat 23 and the operator's controls.

Preferred Embodiment

To facilitate the assembly of the harvester, the base unit 1 (i.e. the entire combine harvester minus the elevator 4 and the header 5), is composed of a plurality of sub-assemblies or modules, one of which is shown at 24 in FIG. 2. The sub-assembly 24 is mobile in its own right and comprises a chassis in the form of a generally rectangular framework 25 which is elongate in a fore-and-aft direction and which comprises laterally spaced side members 32. The rectangular frame work 25 is supported at its front end by a front traction arrangement 26 comprising a central gearbox 27, traction axles 43 and the pair of traction wheels 2, and at its rear end by a rear steerable wheel structure 29 comprising a transverse beam 30 and the pair of steerable wheels 3. The side members 32 carry a pair of front upwardly projecting brackets 33 (substantially at the mid-points of the members 32) and a pair of rear upwardly projecting brackets 34 (at the rear ends of the members 32).

When the sub-assembly 24 is completed to the extent that it comprises the rectangular framework 25 and the wheels 2 and 3, it can be pushed along the assembly line without the need for any supporting carriages. Furthermore, the entire cleaning means 14 can easily be mounted on the subassembly 24 from above because at this stage of assembly no other components obstruct access from above to the cleaning area and because this cleaning area is located at the ideal working height of about one meter above ground level. Therefore, when mounting the cleaning means 14 on the sub-assembly 24, workers can work in the best ergonomic conditions. The cleaning means 14 comprise, in addition to the components 15 to 18 already mentioned, a cleaning shoe 35, two collecting troughs 36 and 37 respectively accomodating a clean grain auger 38 and a tailings auger 39, and a fan housing 40.

FIGS. 3 and 4 show the straw walker sub-assembly 44. The first step in the manufacture of the sub-assembly 44 is the mounting of bearing structures 45 on straw walker shafts 46. As is shown in FIG. 9, the bearing structures 45 comprise roller bearings 28 having an inner diameter which is sufficiently greater than the diameter of the walker shafts 46 to enable the bearings 28 to be passed over the cranks of the straw walker shafts 46. Inner races of the roller bearings 28 are fastened to the shafts 46 by means of tapered clamps 31. The bearing structures 45 further comprise supports 41 for supporting the straw walkers 13 on the bearings 28. When mounting the bearing structures 45 on the shafts 46 it is important that the bearings 28 are fastened to the shafts 46 at the right locations. Therefore, the distances 48, 49, 50 are accurately measured and checked.

Thereafter, the front and rear straw walker shafts 46 are placed in the assembly jig 51 shown in FIGS. 3 and 4, after which the straw walkers 13 are mounted on the respective bearing structures 45 while maintaining not only the appropriate clearance 80 between a reference member 52 of the assembly jig 51 and the adjacent straw walker 13 but also the clearances 53 between adjacent straw walkers 13.

Figures 5, 6:
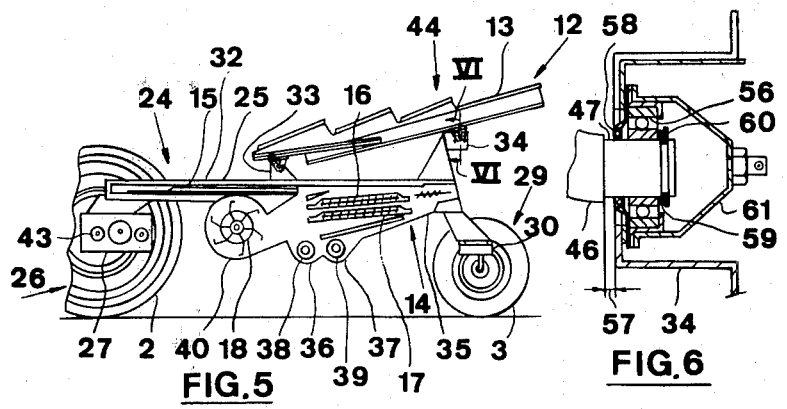
FIG. 5 is a view similar to that of FIG. 2 but illustrating the combine harvester in a further assembly stage.
FIG. 6 is a sectional view, on an enlarged scale, on the line VI—VI of FIG. 5, FIGS. 7 and 8 are views similar to that of FIG. 5 but illustrating the combine harvester in two further stages of assembly.

The straw walker sub-assembly 44 is then mounted on the sub-assembly 24 (which already carries the cleaning means 14) as indicated schematically in FIG. 5, by means of a hoist suspended from a travelling trolley. While doing this, it is important that the ends 47 of the shafts 46 enter respective recesses 54 and 55 in the brackets 33 and 34. Bearings 56 (FIG. 6) are mounted on the shaft ends 47 and secured to the brackets 33 and 34 while maintaining clearance 57. Sealing means 58 are provided between the bearings 56 and the brackets 33 and 34 while side spacers 59 may be provided between the bearings 56 and circlips 60 fitted on the shaft ends 47. Finally, a greasing cap 61 may be mounted around the shaft ends 47 and the bearings 56 to retain grease.

The foregoing method of mounting the straw walkers 13 on the associated shafts 46 to form the straw walker subassembly 44 and then to mount the latter in a further step on the mobile sub-assembly 24 is advantageous in several respects: it is less complicated to ensure that the narrow tolerances are kept, as there is ample space available and as the assembly jig can be placed at the ideal level above the ground for facilitating pre-assembly work; and the risk of damaging other components of the harvester is reduced to a minimum.

Figure 7:
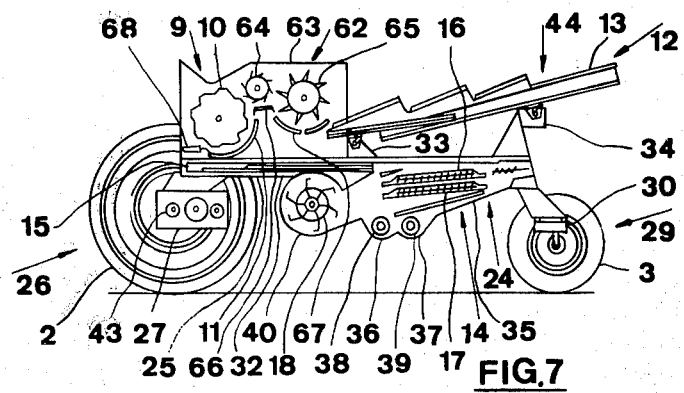

A third sub-assembly or module generally indicated at 62 comprises a framework 63 including a plurality of rotary components such as the threshing cylinder 10, a straw beater 64 and a rotary separator 65. This sub-assembly 62 further comprises the threshing concave 11 end the grids 66, 67 respectively disposed below the thresing cylinder 10, the straw beater 64 and the rotary separator 65, and a stone trap 68 disposed forwardly of the threshing concave 11. Preferably, the sub-assembly 62 is arranged to be bolted on the sub-assembly 24 forwardly of the straw walker sub-assembly 44, as shown schematically in FIG. 7.

Figure 8:
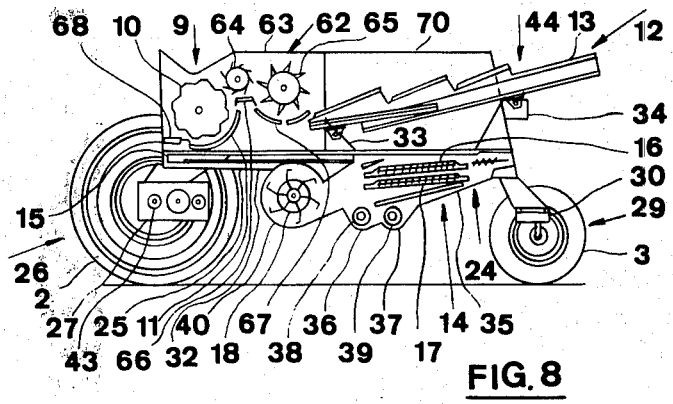

In a further assembly step, side walls 70 can be bolted or otherwise secured to the sub-assembly 24 and to the sub-assembly 62 so as to extend beside the straw walkers 13 on both sides thereof (FIG. 8).

Figure 10:
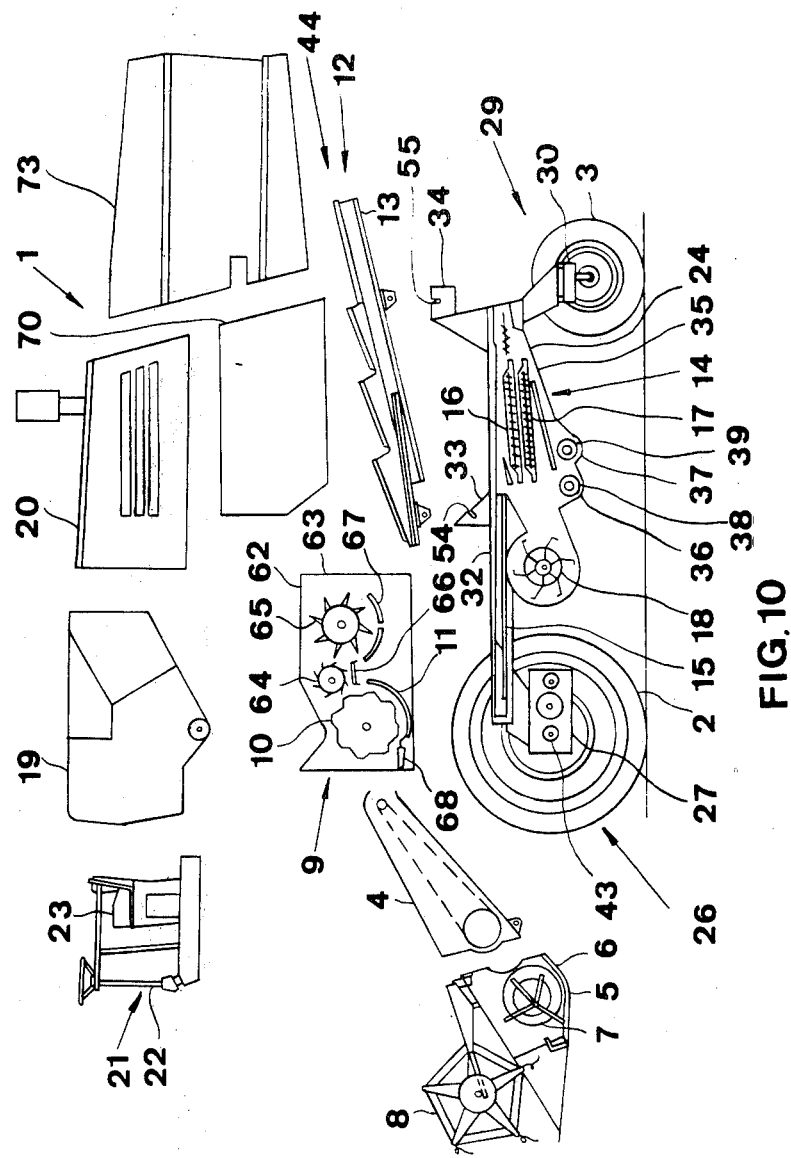
FIG. 10 is an "exploded" view of the parts of the combine harvester.

As is shown in FIGS. 1 and 10, further sub-assemblies or modules remain to be attached before the base unit 1 is complete. These modules are the grain tank 19, the clean grain and the tailings elevator 71 and 72 respectively (shown only in FIG. 1), the engine in its compartment 20, a straw hood 73 and the operator's platform 21 with all controls thereon.

From the foregoing, it will be clear that the construction of a harvesting machine according to the invention is simplified to a considerable extent, so that construction time and manufacturing costs are reduced. These advantages are especially important in the case of mass production.

It will also be appreciated that by applying the module principle to the greates possible extent, it is possible to make the sub-assemblies of the most appropriate materials.

Furthermore the base unit 1 is divided in a number of modules of which some can be considered as individual independent functional units. The sub-assembly 24 carries the entire cleaning means 14 and the traction components while the sub-assembly 62 comprises the most important rotary components such as the threshing cylinder 10, the straw beater 64 and the rotary separator 65. These independent units may facilitate individual testing while design changes may be easier to implement. Damaged sub-assemblies may easily be replaced by new sub-assemblies or dismantled for individual attention. Moreover, some sub-assemblies may be common to a number of combine harvesters in a range.

Having thus described the invention, what is claimed is:

1. A harvesting machine made of a plurality of sub-assemblies connected together, comprising:
   a mobile sub-assembly having a front end and a rear end, a pair of front wheels and a pair of rear wheels interconnected by a framework forming a chassis for the machine;
   a separate, self-contained, self-supporting sub-assembly mountable atop the rear end portion of the mobile sub-assembly and having straw walkers rotatably mounted on a pair of straw walker shafts; and
   mounting means on the mobile sub-assembly for mounting the separate, self-contained, self-supporting sub-assembly on the mobile sub-assembly.

2. The harvesting machine as recited in claim 1, wherein the mobile sub-assembly comprises at the forward end thereof a gearbox connected in driving relationship to the front wheels, steerable rear wheels, a grain pan at the forward end of the framework thereof, a cleaning shoe rearwardly of the grain pan, and a cleaning fan forwardly of the cleaning shoe and below the rear end of the grain pan.

3. The harvesting machine as recited in claim 1, further comprising a third sub-assembly mounted on the mobile sub-assembly and forwardly of the separate, self-contained, self-supporting sub-assembly, the third sub-assembly having mounted thereto a rotatable threshing cylinder with a cooperable threshing concave, a rotatable straw beater, a rotary separator means and separator grids cooperable respectively with the straw beater and the rotary separator.

4. The harvesting machine as recited in claim 3 wherein the third sub-assembly further also comprises a stone trap forwardly of the threshing cylinder and cooperable concave.

5. A harvesting machine comprising:
   (a) a pair of front wheels;
   (b) a pair of rear wheels;
   (c) a first elongate framework with laterally spaced side members having a forward end and a rear end interconnecting the front and rear wheels forming therewith a mobile sub-assembly and a chassis for the machine, the framework further supporting cleaning means mounted on the mobile sub-assembly generally between the front and rear wheels,
   (d) a pair of rotatable straw walker shafts having a plurality of straw walkers rotatably mounted thereto for forming therewith a further separate, self-contained, self-supporting sub-assembly and means on the frame work for mounting the separate, self-contained, self-supporting sub-assembly on the mobile sub-assembly at a location generally above the cleaning means.

6. The harvesting machine as recited in claim 5, wherein the mobile sub-assembly comprises at the forward end thereof a gearbox connected in driving relationship to the front wheels, the rear wheels being steerable.

7. The harvesting machine as recited in claim 5, wherein the cleaning means comprise:
   a grain pan at the forward end of the framework of the mobile sub-assembly,
   a cleaning shoe rearwardly of the grain pan, and
   a cleaning fan forwardly of the cleaning shoe and below the rear end of the grain pan.

8. The harvesting machine as recited in claim 5, further comprising:
   a second framework mountable at the forward end having mounted thereon a rotatable threshing cylinder, a threshing concave cooperable with the threshing cylinder, and a rotatable straw beater rearwardly of the threshing cylinder, the second framework together with the threshing cylinder, threshing concave and straw beater forming a third sub-assembly for mounting on the mobile sub-assembly forwardly of the further sub-assembly.

9. The harvesting machine as recited in claim 8, wherein the third sub-assembly further also comprises a rotary separator means and separator grids cooperable with the straw beater and the rotary separator means.

10. The harvesting machine as recited in claim 8, wherein the third sub-assembly further also comprises a stone trap forwardly of the threshing cylinder and cooperable concave.

11. A method of assembling a harvesting machine by connecting together a plurality of sub-assemblies, the method comprising the steps of:
- (a) interconnecting front and rear wheels by a framework whereby a mobile sub-assembly is formed, the mobile sub-assembly forming a chassis for the machine,
- (b) assembling straw walkers on rotatable straw walker shafts so as to form a separate, self-contained, self-supporting straw walker sub-assembly, and
- (c) mounting the straw walker sub-assembly on the mobile sub-assembly.

12. The method as recited in claim 11 further comprising the step of mounting cleaning means on the mobile sub-assembly prior to mounting the straw walker sub-assembly thereon.

13. The method as recited in claim 11 wherein the step of assembling the straw walker sub-assembly comprises:
- (a) supporting the straw walker shafts on an assembly jig; and
- (b) subsequently mounting the straw walkers on the straw walker shafts while being supported on the assembly jig.

14. The method as recited in claim 11 further also comprising the steps of:
- (a) rotatably mounting a threshing cylinder, together with a cooperable threshing concave on a further sub-assembly; and
- (b) mounting the threshing sub-assembly on the mobile sub-assembly at a location forwardly of the straw walker sub-assembly.

15. A method of assembling a harvesting machine by connecting together a plurality of sub-assemblies, the method comprising the steps of:
- (a) interconnecting a pair of drive wheels and a pair of steerable wheels by a framework, whereby a mobile sub-assembly is formed, the mobile sub-assembly forming a chassis for the machine;
- (b) mounting cleaning means on the mobile sub-assembly, the cleaning means having a forward grain pan, a cleaning shoe rearwardly of the grain pan and a cleaning fan forwardly of the cleaning shoe and below the rear end of the grain pan;
- (c) forming a separate, self-contained, self-supporting straw walker sub-assembly, comprising straw walkers rotatably mounted on a pair of straw walker shafts;
- (d) mounting the straw walker sub-assembly on the mobile sub-assembly, generally above the cleaning shoe and so that the straw walker shafts are rotatable,
- (e) assembling a rotatable threshing cylinder and cooperable threshing concave, and a rotatable straw beater in a further sub-assembly; and
- (f) mounting the further sub-assembly on the mobile sub-assembly generally above the grain pan.

* * * * *